W. J. DAVIS AND J. HAMMELL.
AUTOMOBILE TIRE.
APPLICATION FILED FEB. 5, 1921.
1,378,331. Patented May 17, 1921.
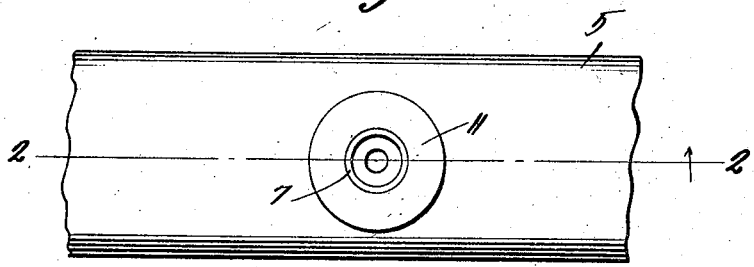
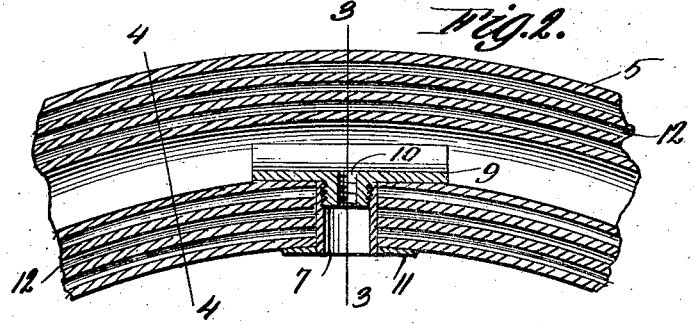
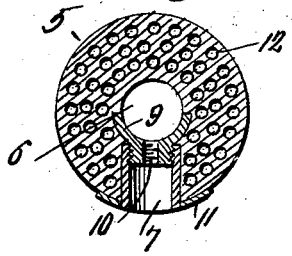
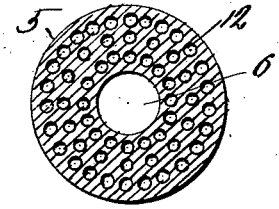
WITNESSES
WILLIAM J. DAVIS
JAMES Hammell  INVENTOR.
BY
ATTORNEY.

UNITED STATES PATENT OFFICE.

WILLIAM J. DAVIS AND JAMES HAMMELL, OF TIPTON, INDIANA.

AUTOMOBILE-TIRE.

1,378,331. Specification of Letters Patent. Patented May 17, 1921.

Application filed February 5, 1921. Serial No. 442,858.

*To all whom it may concern:*

Be it known that we, WILLIAM J. DAVIS and JAMES HAMMELL, citizens of the United States, residing at Tipton, in the county of Tipton and State of Indiana, have invented certain new and useful Improvements in an Automobile-Tire, of which the following is a specification.

This invention relates to automobile tires and has principally for an object the provision of a tire which is characterized by all the advantages of the standard pneumatic tire, but which is so constructed as to reduce possibility of puncture to a minimum.

A further object of the invention is to eliminate the use of the inner tube, at the same time, providing a compartment for the reception of air so as to produce the desired resiliency when the tire travels over inequalities on the road.

The above and other objects of this invention will be in part described and in part understood from the following description of the present preferred embodiment of the invention taken in connection with the accompanying drawings, wherein:

Figure 1, is a fragmentary plan view of a tire constructed in accordance with this invention.

Fig. 2, is a longitudinal sectional view taken on the line 2—2 of Fig. 1, looking in the direction of the arrow.

Fig. 3, is a sectional view taken on the line 3—3 of Fig. 2, and

Fig. 4, is a similar view taken on the line 4—4 of Fig. 2.

The device of this invention consists of a tire 5 which is of a configuration simulating standard pneumatic tires, except that the tire is circular in cross-section since it is unnecessary to provide an opening for the insertion of the inner tube. The tire is of substantially solid form and is provided with a central circumferentially extending air compartment 6 which is in communication with an air duct 7. The duct 7 consists of a cylindrical tube, the upper inner periphery of which is screw threaded for engagement with a correspondingly formed nipple, which is formed upon a protective plate 9. The plate 9 is mounted in the air compartment 6 and is provided with a screw threaded opening 10, which extends through the said nipple and is adapted for the reception of an air valve of the usual or any desired type through which compressed air may be introduced in a manner well known in the art. The inner end of the duct 9 extends beyond the inner periphery of the tire and is embraced by a plate 11, the latter engaging the inner periphery of the tire 5. The plates 9 and 11 serve to prevent the leakage of air from the compartment 6.

In order to add to the resiliency of the tire, a plurality of circumferentially extending channels 12 are formed therein, these channels surrounding the compartment 6, as shown to advantage in Figs. 3 and 4. These channels may be arranged in any desired manner, but preferably are in relatively close proximity to one another for affording the greatest possible resiliency.

Upon reference to Fig. 3 of the drawing, it will be noted that the plate 9 is of an arcuate shape to conform to the base of the tire and is countersunk in the latter so as to in no way serve as a baffle for the air contained in the compartment 6.

Various changes may be made in this device, especially in the details of construction, proportion and arrangement of parts without departing from the spirit and scope of the invention as covered by the appended claims.

What is claimed is:

1. An automobile tire including a solid resilient body provided with a central circumferential air compartment, a duct leading into said compartment to permit the introduction of air thereinto, said body having a series of channels surrounding said compartment.

2. An automobile tire including a solid body provided with a circumferential air compartment, a protective plate mounted in the tire and countersunk therein, an air duct detachably connected to said plate to permit the introduction of air into said compartment through the tube and plate.

3. An automobile tire including a solid body circular in cross section and provided with an air compartment which is in communication with a duct to permit the air in said compartment to be replenished, and a series of closely arranged circumferential channels formed in said tire to increase the resiliency of the latter.

In testimony whereof we affix our signatures in presence of two witnesses.

WILLIAM J. DAVIS.
JAMES HAMMELL.

Witnesses:
WILLIAM W. CLARK,
ELEANOR CLARK.